United States Patent
Kawashima

(10) Patent No.: US 8,314,862 B2
(45) Date of Patent: Nov. 20, 2012

(54) FILTER CIRCUIT, IMAGE PROCESSING APPARATUS, IMAGING APPARATUS, IMAGE PROCESSING METHOD, AND COMPUTER PROGRAM

(75) Inventor: Manabu Kawashima, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/784,739

(22) Filed: May 21, 2010

(65) Prior Publication Data

US 2010/0302413 A1 Dec. 2, 2010

(30) Foreign Application Priority Data

May 29, 2009 (JP) ................ P2009-131290

(51) Int. Cl.
*H04N 5/217* (2011.01)
*G06K 9/40* (2006.01)
(52) U.S. Cl. ............... 348/241; 382/260; 382/261
(58) Field of Classification Search .......... 348/241, 348/252, 254; 382/260, 261
See application file for complete search history.

(56) References Cited

U.S. PATENT DOCUMENTS

| 6,906,704 | B2 * | 6/2005 | Matsutani et al. | 345/204 |
|---|---|---|---|---|
| 7,643,696 | B2 * | 1/2010 | Kita | 382/260 |
| 7,847,838 | B2 * | 12/2010 | Ooishi | 348/241 |
| 8,072,511 | B2 * | 12/2011 | Masaoka et al. | 348/241 |
| 8,121,429 | B2 * | 2/2012 | Kondo et al. | 382/254 |
| 8,149,299 | B2 * | 4/2012 | Ohwaki et al. | 348/241 |
| 2008/0170137 | A1 * | 7/2008 | Matsumoto et al. | 348/241 |
| 2008/0239090 | A1 * | 10/2008 | Ohwaki et al. | 348/222.1 |
| 2009/0033773 | A1 * | 2/2009 | Kinoshita et al. | 348/241 |
| 2009/0167904 | A1 * | 7/2009 | Matsushima | 348/241 |

FOREIGN PATENT DOCUMENTS

JP 2006 180268 7/2006

* cited by examiner

*Primary Examiner* — Nhan T Tran
*Assistant Examiner* — Amy Hsu
(74) *Attorney, Agent, or Firm* — Frommer Lawrence & Haug LLP; William S. Frommer

(57) ABSTRACT

A filter circuit includes: a first weight-coefficient calculating unit calculating first weight coefficients concerning pixel levels in a first pixel and second pixels surrounding the first pixel; a first weight-coefficient adjusting unit replacing, when the first weight coefficients of a pair of the second pixels symmetrically arranged across the first pixel are different from each other, the first weight coefficient of the second pixel having a larger one of the first weight coefficients of the pair of the second pixels with the first weight coefficient of the second pixel having a smaller one of the first weight coefficients; a third weight-coefficient calculating unit integrating the first weight coefficients and second weight coefficients concerning positions of the pixels to calculate third weight coefficients of the pixels; and a correction processing unit correcting the pixel level of the first pixel using the third weight coefficients and the pixel levels of the pixels.

6 Claims, 9 Drawing Sheets

SCHEMATIC BLOCK DIAGRAM OF IMAGING APPARATUS

SCHEMATIC BLOCK DIAGRAM OF LINER-PHASE EDGE-PRESERVING SMOOTHING FILTER

DIAGRAM OF SYMMETRICAL AXIS

FLOWCHART FOR IMAGE PROCESSING METHOD

DIAGRAM OF DISTRIBUTION OF WEIGHT COEFFICIENTS
BEFORE LEVEL WEIGHT COEFFICIENT ADJUSTMENT

SPACE WEIGHT COEFFICIENT (STATIC)

LEVEL WEIGHT COEFFICIENT (ADAPTIVE ASYMMETRY)

DIAGRAM OF DISTRIBUTION OF WEIGHT COEFFICIENTS
AFTER LEVEL WEIGHT COEFFICIENT ADJUSTMENT

SPACE WEIGHT COEFFICIENT (STATIC)

LEVEL WEIGHT COEFFICIENT (ADAPTIVE ASYMMETRY)

GRAPH OF FREQUENCY CHARACTERISTIC OF PHASE OF
LINEAR-PHASE EDGE-PRESERVING SMOOTHING FILTER

GRAPH OF FREQUENCY CHARACTERISTIC OF AMPLITUDE OF
LINEAR-PHASE EDGE-PRESERVING SMOOTHING FILTER

DIAGRAM OF DISTRIBUTION OF WEIGHT IN SPACE DIRECTION AND LEVEL DIRECTION
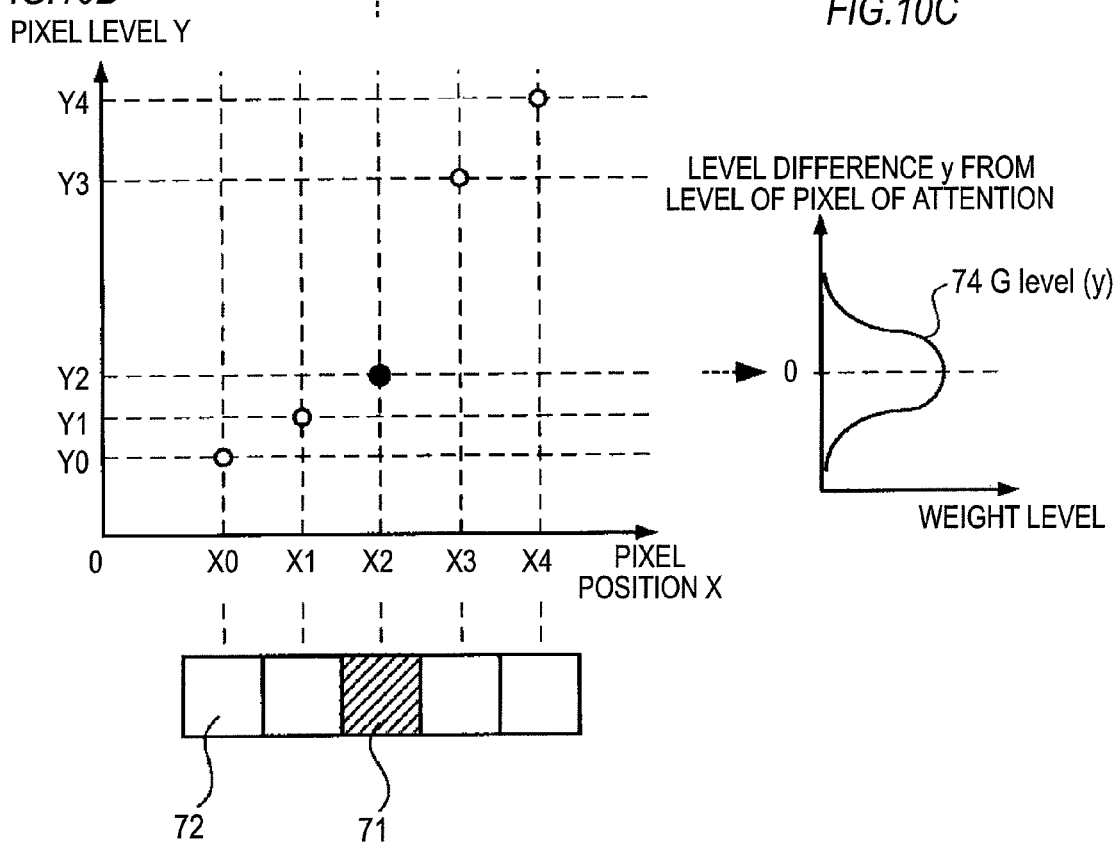

FILTER CIRCUIT, IMAGE PROCESSING APPARATUS, IMAGING APPARATUS, IMAGE PROCESSING METHOD, AND COMPUTER PROGRAM

BACKGROUND OF THE INVENTION

1. Field of the Invention

The present invention relates to a filter circuit that smoothes an image while preserving an edge of the image, an image processing apparatus and an imaging apparatus including the filter circuit, an image processing method, and a computer program.

2. Description of the Related Art

In the past, in image processing apparatuses for still images, moving images, and the like, various filters (filter circuits) are used in order to improve image quality. As one of the filters, there is a filter called bilateral filter (see, for example, JP-A-2006-180268).

The bilateral filter is a nonlinear filter mainly used for noise removal and has a characteristic that the bilateral filter can realize smoothing of an image while preserving an edge of the image. In order to obtain this characteristic, the bilateral filter determines weight taking into account not only a distance between pixels but also a difference in pixel values (luminance) between the pixels. In the following explanation, a filter that can perform such processing is also referred to as an edge-preserving smoothing filter. A processing principle of the bilateral filter in the past is briefly explained with reference to FIGS. 10A to 10C.

FIGS. 10A to 10C are diagrams for explaining a principle of filter processing by a bilateral filter with a one-dimensional filter frame including five taps (five pixels) around a pixel of attention 71, i.e., a bilateral filter with a minimum filter frame of 1×5 pixels. FIG. 10A is a diagram of the distribution of weight coefficients in a space direction (weight coefficients concerning positions) in the pixel of attention 71 shown in FIG. 10B. FIG. 10B is a diagram of a relation between pixel positions and pixel levels in the pixel of attention 71 and peripheral pixels 72 around the pixel of attention 71. FIG. 10C is a diagram of the distribution of weight coefficients in a level direction (weight coefficients concerning a pixel level) in the pixel of attention 71.

In an example shown in FIGS. 10A to 10C, processing is performed with a pixel level Y2 of the pixel of attention 71 set as explained below. First, weights Wi (i=0 to 4) are calculated by the following Formula 1 in five pixels in positions X0 to X5 in a filter frame.

$$Wi = Gspace(Xi-X2) \times Glevel(Yi-Y2) \quad \text{Formula 1}$$

Gspace(x) and Glevel(y) in Formula 1 are distribution functions of weight coefficients in the space direction and the level direction in the respective pixels. In the bilateral filter, Gspace(x) and Glevel(y) are represented by Gaussian functions. Specifically, Gspace(x) and Glevel(y) are respectively represented by the following Formulas 2 and 3.

$$Gspace(x) = \exp[-x^2/2\sigma^2] \quad \text{Formula 2}$$

$$Glevel(y) = \exp[-y^2/2\sigma^2] \quad \text{Formula 3}$$

In the formulas, x in Formula 2 is equal to X1−X2 (i=0 to 4). y in Formula 3 is equal to Yi−Y2 (i=0 to 4). σ in Formula 2 represents a standard deviation parameter of the Gaussian function.

The pixel level Y2 of the pixel of attention 71 is subjected to correction (smoothing) processing by performing an arithmetic operation of the following Formula 4 using the weights Wi of the pixels and level values Yi of the pixels calculated by Formula 1. Y2' in Formula 4 represents a pixel level of the pixel of attention 71 after the smoothing processing.

$$Y2' = \sum_{i=0}^{4} (Wi \times Yi) \Big/ \sum_{i=0}^{4} Wi \quad \text{Formula 4}$$

In the filter processing by the bilateral filter in the past, smoothness can be adjusted by changing the standard deviation parameter σ of the distribution functions Gspace(x) and Glevel(y) of the weight coefficients in the space direction and the level direction. Usually, the amplitude of a noise level is considered to be smaller than that of an edge in an image. Therefore, it is possible to smooth only noise while preserving the edge of the image by adjusting σ of the distribution function Glevel(y) of the weight coefficient in the level direction to a standard deviation of the noise level.

SUMMARY OF THE INVENTION

Since the bilateral filter can smooth only the noise while preserving the edge of the image as explained above, the bilateral filter is extremely effective as a filter for improving image quality. Therefore, in recent years, there is a demand for development of such an edge-preserving smoothing filter having more excellent characteristics.

Therefore, it is desirable to provide a filter circuit of an edge-preserving smoothing type having higher performance, an image processing apparatus and an imaging apparatus including the filter circuit, an image processing method, and a computer program.

According to a first embodiment of the present invention, there is provided a filter circuit including a first weight-coefficient calculating unit, a first weight-coefficient adjusting unit, a third weight-coefficient calculating unit, and a correction processing unit. Functions of the units are as explained below. The first weight-coefficient calculating unit calculates first weight coefficients concerning pixel levels in a first pixel and plural second pixels arranged around the first pixel. The first weight-coefficient adjusting unit adjusts, when the first weight coefficients of a pair of the second pixels arranged in symmetrical positions across the first pixel are different from each other, the first weight coefficients of the pair of the second pixels to be the same value. In adjusting the first weight coefficients, the first weight-coefficient adjusting unit replaces the first weight coefficient of the second pixel having a larger one of the first weight coefficients of the pair of the second pixels with the first weight coefficient of the second pixel having a smaller one of the first weight coefficients. The third weight-coefficient calculating unit integrates the first weight coefficients of the pixels calculated by the first weight-coefficient adjusting unit and second weight coefficients concerning positions of the pixels to calculate third weight coefficients of the pixels. The correction processing unit corrects the pixel level of the first pixel using the third weight coefficients of the pixels calculated by the third weight-coefficient calculating unit and the pixel levels of the pixels.

According to a second embodiment of the present invention, there is provided an image processing apparatus including the filter circuit according to the first embodiment and a control unit that controls processing operation of the filter circuit.

According to a third embodiment of the present invention, there is provided an imaging apparatus including an imaging unit that photoelectrically converts a subject light to generate an image signal and the filter circuit according to the first embodiment.

According to a fourth embodiment of the present invention, there is provided an image processing method and a computer program in which processing is performed as explained below. First, first weight coefficients concerning pixel levels in a first pixel and plural second pixels arranged around the first pixel are calculated. Subsequently, when the first weight coefficients of a pair of the second pixels arranged in symmetrical positions across the first pixel are different from each other, the first weight coefficients of the pair of the second pixels are adjusted to be the same value. When the first weight coefficients are adjusted, the first weight coefficient of the second pixel having a larger one of the first weight coefficients of the two second pixels is replaced with the first weight coefficient of the second pixel having a smaller one of the first weight coefficients. Subsequently, the first weight coefficients of the pixels and second weight coefficients concerning positions of the pixels are integrated to calculate third weight coefficients of the pixels. The pixel level of the first pixel is corrected by using the third weight coefficients of the pixels and the pixel levels of the pixels.

As explained above, in the embodiments of the present invention, the first weight coefficients of the pair of the second pixels arranged in the symmetrical positions across the first pixel are adjusted to be the same value. Consequently, it is possible to distribute the first weight coefficients of the second pixels symmetrically to the first pixel in all directions passing the first pixel and linearize (linear-phase correcting) the first weight coefficients in the filter circuit.

In the embodiments of the present invention, the first weight coefficient of the second pixel having a large one of the first weight coefficients of the pair of the second pixels arranged in the symmetrical positions across the first pixel is replaced with the first weight coefficient of the second pixel having a smaller one of the first weight coefficients. Consequently, it is possible to smooth only noise while preserving an edge of an image.

As explained above, in the embodiments of the present invention, it is possible not only to smooth only noise while preserving an edge of an image but also to linearize (linear-phase correcting) the first weight coefficients. Therefore, according to the embodiments of the present invention, it is possible to provide a filter circuit of an edge-preserving smoothing type of higher performance.

BRIEF DESCRIPTION OF THE DRAWINGS

FIGS. 10A to 10C are diagrams for explaining a processing principle of a bilateral filter in the past.

DESCRIPTION OF THE PREFERRED EMBODIMENTS

Figure 1:
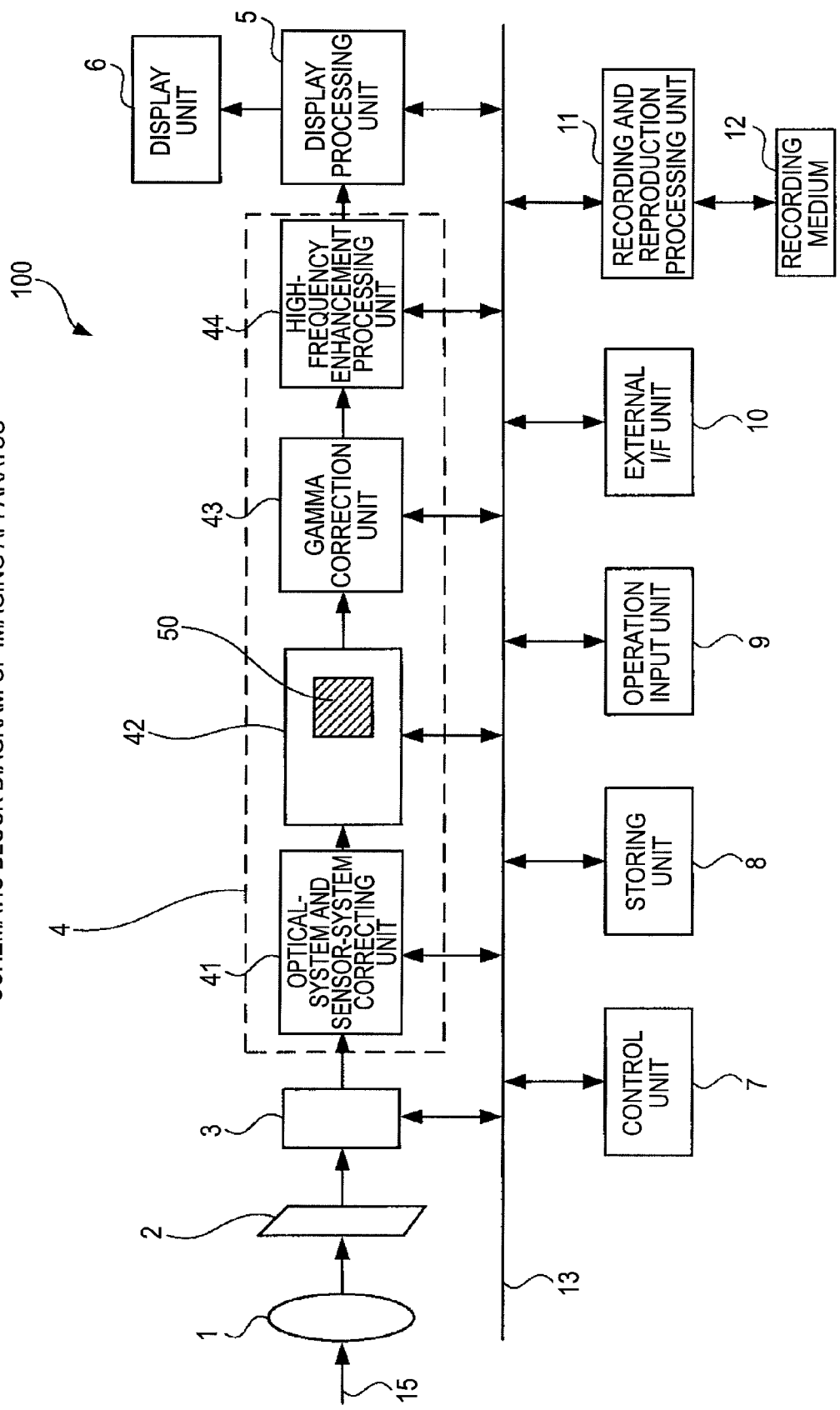
FIG. 1 is a schematic block diagram of an imaging apparatus according to an embodiment of the present invention.

Specific examples of a filter circuit, an image processing apparatus including the filter circuit, and an image processing method according to an embodiment of the present invention are explained in order described below with reference to the accompanying drawings. The present invention is not limited to the examples explained below.

1. Configuration example of an imaging apparatus
2. Procedure of image processing
3. Frequency characteristics of a linear-phase edge-preserving smoothing filter <1. Configuration Example of an Imaging Apparatus>

In this embodiment, an imaging apparatus such as a camera is explained as an example of the image processing apparatus including the filter circuit according to this embodiment. However, the filter circuit according to this embodiment can be applied not only to the imaging apparatus but also to all apparatuses and systems having an image processing function such as a display, a display device of a printer or the like, and an apparatus including a video processing application. When the filter circuit according to this embodiment is applied to the imaging apparatus, the filter circuit can be applied not only to the camera itself but also to an information processing apparatus (e.g., a portable terminal apparatus) having a photographing function (a camera module).

Before the configuration of the filter circuit according to this embodiment and the imaging apparatus including the filter circuit is specifically explained, problems in the bilateral filter in the past or derivative filters of the bilateral filter are explained. In the bilateral filter in the past, filter characteristics of weight coefficients in a level direction (hereinafter referred to as level weight coefficients) in pixels are represented by complex numbers. Phases of the weight coefficients do not have a linear phase property (linearity) with respect to a space frequency. Therefore, in particular, in an area near an edge of an image, in some case, an image waveform is distorted.

The problem is more specifically explained. In a filter, phases of level weight coefficients of which are linear, delay amounts of the phases are fixed irrespectively of a space frequency of an image in pixels subjected to filter processing and a group delay occurs. In this case, a delay difference of phases does not occur and an image waveform is not distorted between adjacent pixels after the filter processing. However, when level weighing coefficients have nonlinear phases (are nonlinear) with respect to a space frequency as in the bilateral filter, a delay difference occurs in phases between adjacent pixels after the filter processing. When the delay difference occurs, since a delay amount of the delay difference changes according to a pattern of an image, an image waveform is distorted. In particular, in a moving image, even if an object is at a standstill, since a delay amount changes because of the influence of noise, the position of an edge of an object image does not come to a standstill but always fluctuates.

In this embodiment, configuration examples of a filter circuit of an edge-preserving smoothing type that can solve the problems while maintaining the characteristic that the filter circuit can realize smoothing of an image while preserving an edge of the image (the characteristic of the bilateral filter in the past) and an imaging apparatus including the filter circuit are explained.

[Configuration of the Imaging Apparatus]

FIG. 1 shows the schematic block configuration of the imaging apparatus according to this embodiment. An imaging apparatus 100 includes a lens 1, an imaging device (an imaging unit) 2, an analog to digital converter 3 (hereinafter, referred to as ADC), and an image processing unit 4. The lens 1, the imaging device 2, the ADC 3, and the image processing unit 4 are arranged in this order from an incident side of subject light 15.

The imaging apparatus 100 further includes a display processing unit 5, a display unit 6, a control unit 7, a storing unit 8, an operation input unit 9, an external interface unit (hereinafter referred to as external I/F unit) 10, a recording and reproduction processing unit 11, and a recording medium 12. The units of the imaging apparatus 100 are electrically connected directly or indirectly via a signal line 13.

The lens 1 captures subject light and focuses the subject light on an imaging surface (not shown) of the imaging device 2. The imaging device 2 photoelectrically converts the subject light focused by the lens 1 to generate an image signal. The imaging device 2 outputs the generated image signal to the ADC 3. As the imaging device 2, for example, image sensors of various types such as a CCD (Charge Coupled Devices) type and a CMOS (Complementary Metal Oxide Semiconductor) type can be applied.

A configuration example of the imaging apparatus 100 including one imaging device 2 is shown in FIG. 1. However, the present invention is not limited to this. When the imaging apparatus 100 is, for example, a 3CCD camera that obtains image signals corresponding to three colors of R (red), G (green), and B (blue) independently from one another, three imaging devices 2 are provided. In this case, a color separation prism that separates incident light into three colors of R, G, and B is arranged between an imaging device group including the three imaging devices 2 and the lens 1. When the imaging apparatus 100 is a 1CCD camera, a color filter array is arranged between the lens 1 and the imaging device 2.

The ADC 3 converts an analog image signal output from the imaging device 2 into a digital image signal and outputs the digitally converted image signal to the image processing unit 4. When the CMOS image sensor is used as the imaging device 2, since analog to digital conversion processing for an image signal is also performed in the inside of the imaging device 2, the ADC 3 is unnecessary.

The image processing unit 4 applies various kinds of processings to the image signal output from the ADC 3 and outputs the image signal after the processing to the display processing unit 5. The image processing unit 4 includes an optical-system and sensor-system correcting unit 41, a noise-reduction processing unit 42, a gamma correction unit 43, and a high-frequency-enhancement processing unit 44.

The optical-system and sensor-system correcting unit 41 performs correction processing for distortion of an image signal caused by the lens 1 (correction processing for an optical system) and correction processing for distortion caused by the imaging device 2 (correction processing for a sensor system). In the correction processing for an optical system, the optical-system and sensor-system correcting unit 41 performs, for example, distortion correction, aberration correction, ambient light amount drop correction, and flare correction. In the correction processing for the sensor system, the optical-system and sensor-system correcting unit 41 performs, for example, defect correction for pixels and shading correction. When the CMOS image sensor is used as the imaging device 2, the optical-system and sensor-system correcting unit 41 also performs vertical streak correction or the like as the correction processing for the sensor system. When the CCD image sensor is used as the imaging device 2, the optical-system and sensor-system correcting unit 41 also performs smear correction or the like as the correction processing for the sensor system.

The noise-reduction processing unit 42 applies noise removal processing to the image signal output from the optical-system and sensor-system correcting unit 41 and outputs the signal after the noise removal processing to the gamma correction unit 43. In this embodiment, an edge-preserving smoothing filter 50, level weight coefficients of which have a linear phase property (linearity) with respect to a space frequency, (hereinafter referred to as linear-phase edge-preserving smoothing filter) is provided in the noise-reduction processing unit 42. In this embodiment, a configuration example in which the bilateral filter in the past is further improved to impart a linear phase property to the level weight coefficients is explained as the linear-phase edge-preserving smoothing filter (a filter circuit) 50. The configuration of the linear-phase edge-preserving smoothing filter 50 is explained in detail later.

The gamma correction unit 43 corrects a gamma value of the image signal output from the noise-reduction processing unit 42 to match to a gamma characteristic of the display unit 6. The high-frequency-enhancement processing unit 44 performs correction for enhancing a high-frequency component corresponding to an edge portion (a contour) of an image obtained by the image signal subjected to the gamma correction (contour enhancement correction).

In this embodiment, an example in which the noise-reduction processing unit 42 is arranged at a pre-stage of the gamma correction unit 43, i.e., an example in which the noise-reduction processing unit 42 is arranged in an area in which an image signal has linearity is explained. However, the present invention is not limited to this. The noise-reduction processing unit 42 may be arranged at a post-stage of the gamma correction unit 43. In other words, the noise-reduction processing unit 42 may be arranged in an area in which an image signal has nonlinearity. However, even when the noise-reduction processing unit 42 is arranged at the post-stage of the gamma correction unit 43, the arrangement position of the noise-reduction processing unit 42 is desirably at a pre-stage of the high-frequency-enhancement processing unit 44. This is because it is difficult to obtain sufficient noise reduction effect even if the noise-reduction processing unit 42 applies processing to the image signal after the high-frequency component thereof corresponding to the edge portion of the image is enhanced by the high-frequency-enhancement processing unit 44.

The display processing unit 5 converts the image signal subjected to the various kinds of processing by the image processing unit 4 into a signal of a form displayable in the display unit 6 and outputs the converted signal to the display unit 6. The display unit 6 can include an LCD (Liquid Crystal Display) or an organic EL (Electro Luminescence) panel. The display unit 6 displays the signal supplied from the display processing unit 5 as an image on a display screen.

The control unit 7 includes a CPU (Central Processing Unit). The control unit 7 performs control for the units of the imaging apparatus 100 on the basis of an operation signal and the like supplied from an operation input unit 9 explained later. The storing unit 8 includes a ROM (Read Only Memory) and/or a RAM (Random Access Memory). Computer programs and various data necessary for image processing are stored in the ROM. The RAM is used as a work area for temporarily storing halfway results of various kinds of processing by the control unit 7.

The operation input unit 9 includes operation means such as buttons, dials, and switches. The operation input unit 9 receives a predetermined operation input from a user via the operation means, generates an operation signal corresponding to the content of the operation input, and outputs the generated operation signal to the control unit 7.

The external I/F unit 10 includes input and output terminals (not shown) that can be connected to an external apparatus. The external I/F unit 10 performs input and output of data between the imaging apparatus 100 and the external apparatus via the input and output terminals.

The recording and reproduction processing unit 11 is connected to the recording medium 12 to be explained later. The recording and reproduction processing unit 11 performs processing for recording an image signal output from the image processing unit 4 on the recording medium 12, processing for reading out and reproducing image data recorded in the recording medium 12, and processing for outputting the reproduction signal of the reproduction to the display processing unit 5.

The recording medium 12 can include a HDD (Hard Disk Drive), a semiconductor memory, or an optical disk. The recording medium 12 stores, for example, an image signal having been subjected to processing by the image processing unit 4 and an image signal recorded by a recording device or the like of the outside.

[Configuration of the Linear-Phase Edge-Preserving Smoothing Filter]

Figure 2:
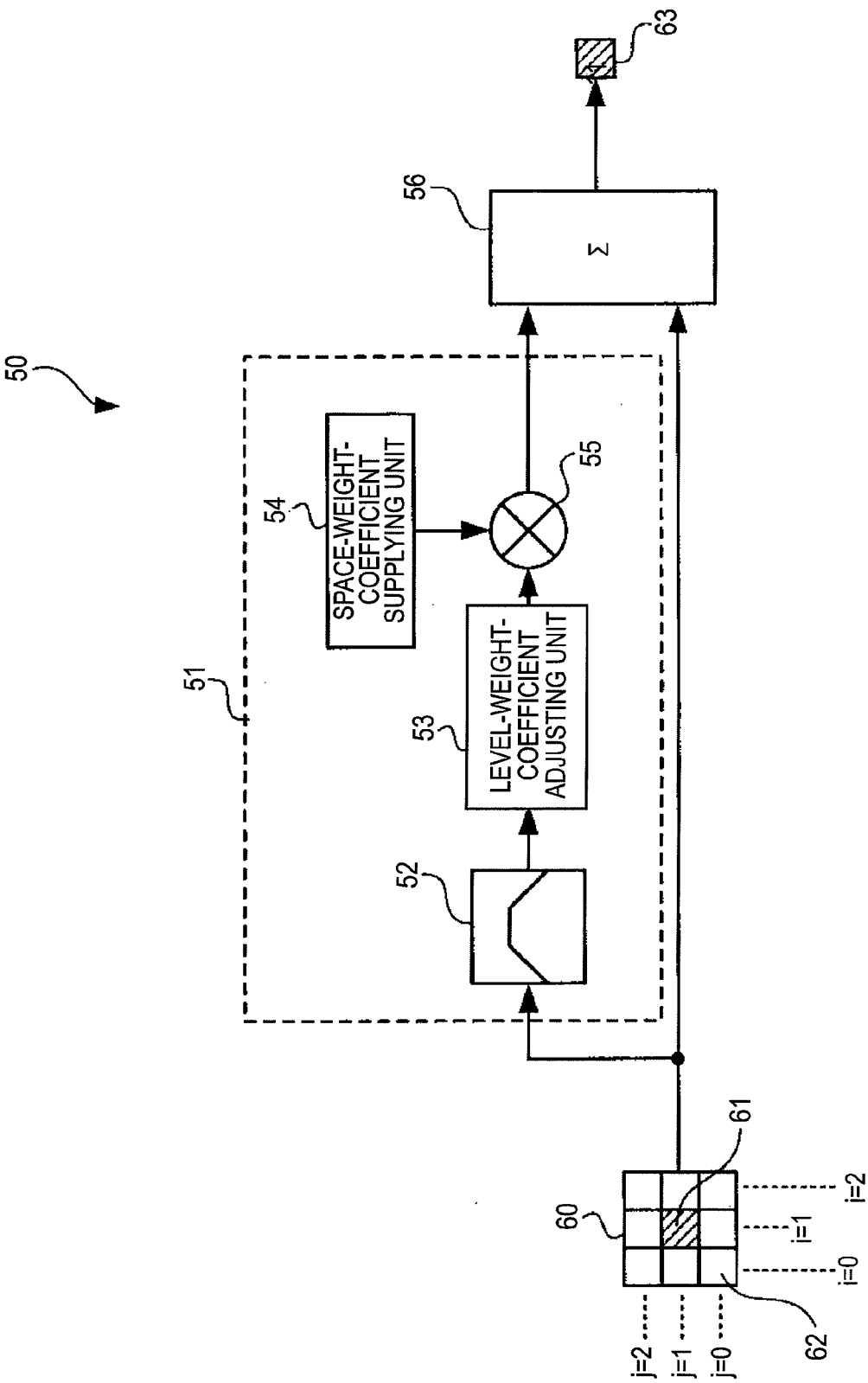
FIG. 2 is a schematic block diagram of a liner-phase edge-preserving smoothing filter according to the embodiment.
Figure 3:
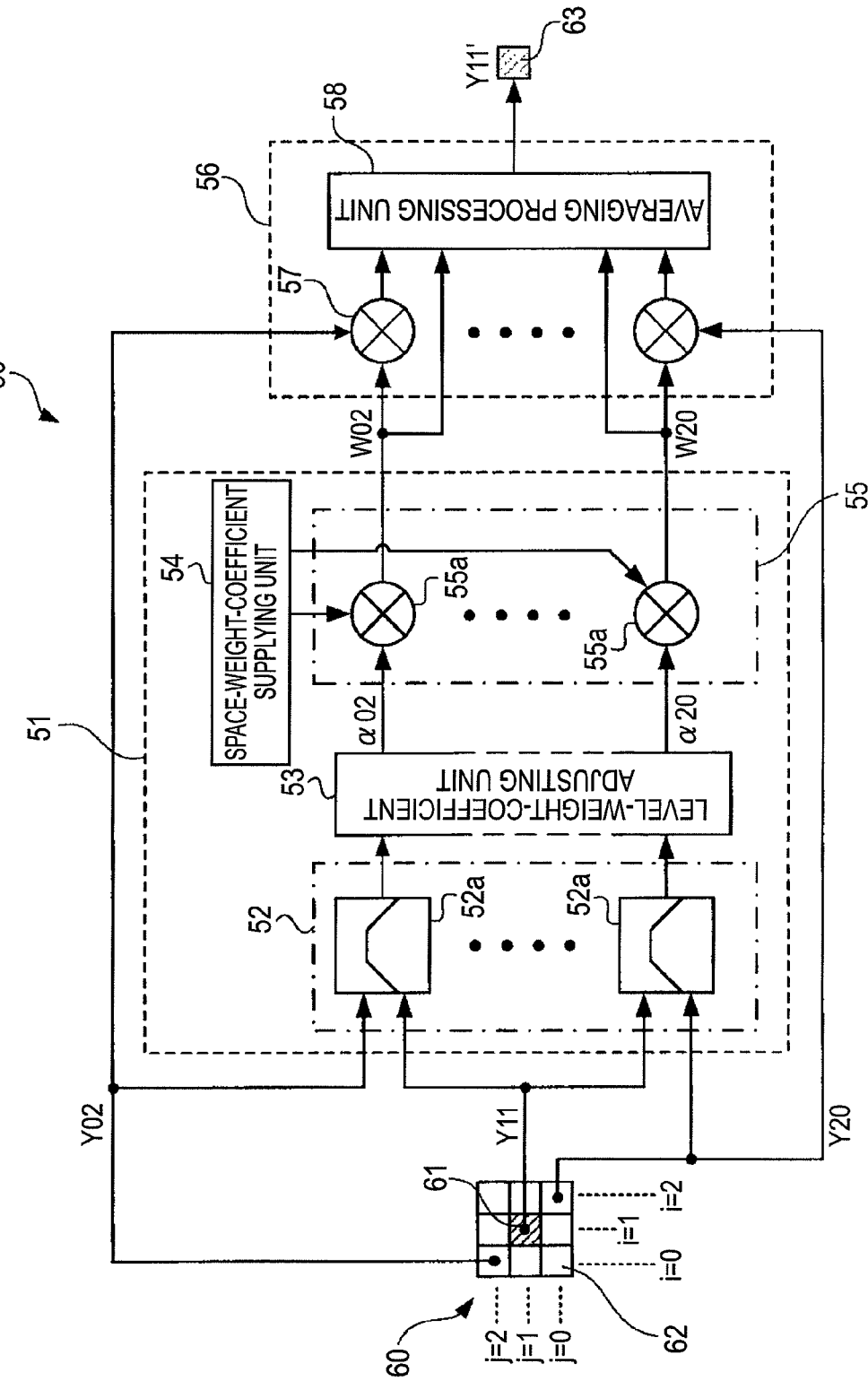
FIG. 3 is a more detailed block diagram of the linear-phase edge-preserving smoothing filter according to the embodiment.

The schematic block configuration of the linear-phase edge-preserving smoothing filter (the filter circuit) 50 is shown in FIGS. 2 and 3. FIG. 3 is a diagram of the internal configuration of the linear-phase edge-preserving smoothing filter 50 shown more in detail than that shown in FIG. 2. In an example shown in FIGS. 2 and 3, the linear-phase edge-preserving smoothing filter 50 having a filter frame including 3×3 pixels is explained. The filter frame is not limited to 3×3 pixels and can be changed as appropriate according to the size of an entire video, an application, and the like.

An input image signal (an image signal) 60 in a unit of 3×3 pixels is input to the liner-phase edge-preserving smoothing filter 50 in this embodiment. The linear-phase edge-preserving smoothing filter 50 smoothes a pixel level of a center pixel (hereinafter referred to as pixel of attention) 61 in the 3×3 pixels using the pixel level of the pixel of attention 61 and the pixel levels of eight pixels 62 adjacent to the periphery of the pixel of attention 61 (hereinafter referred to as peripheral pixels).

In the following explanation, positions X and pixel levels Y of pixels in a filter frame are represented by an index i (=0 to 2) in a direction from the left to right in FIG. 2 and an index j (=0 to 2) in a direction from the bottom to the top in FIG. 2. For example, the position and the pixel level of the pixel of attention (a first pixel) 61 are respectively represented as X11 and Y11.

The linear-phase edge-preserving smoothing filter 50 includes a weight-coefficient processing unit 51 and a weighted-pixel addition unit (a correction processing unit) 56. The weight-coefficient processing unit 51 and the weighted-pixel addition unit 56 are arranged in this order from an input side of the input image signal 60.

The weight-coefficient processing unit 51 calculates weights Wij respectively in the pixels in the 3×3 filter frame. The weight-coefficient processing unit 51 mainly includes, as shown in FIG. 3, a level-weight-coefficient calculating unit (a first weight-coefficient calculating unit) 52, a level-weight-coefficient adjusting unit (a first weight-coefficient adjusting unit) 53, a space-weight-coefficient supplying unit 54, and an integrating unit (a third weight-coefficient calculating unit) 55.

The level-weight-coefficient calculating unit 52 calculates level weight coefficients Wlevel[i, j] (first weight coefficients) in the pixels in the 3×3 filter frame. In this embodiment, the level-weight-coefficient calculating unit 52 calculates the level weight coefficients Wlevel[i, j] on the basis of differences $(Y_{ij}-Y_{11})$ between the pixel levels Yij of the pixels in the 3×3 filter frame (the pixel of attention 61 or the peripheral pixels (second pixels) 62) and the pixel level Y11 of the pixel of attention 61. Specifically, the level-weight-coefficient calculating unit 52 calculates the level weight coefficients Wlevel[i, j] of the pixels according to the following Formula 5.

$$Wlevel[i,j]=Glevel(Y_{ij}-Y_{11}) \qquad \text{Formula 5}$$

In order to realize the arithmetic operation of Formula 5, the level-weight-coefficient calculating unit 52 includes, as shown in FIG. 3, plural level-weight-coefficient calculating circuits 52a. In this example, since the 3×3 filter frame is used, nine level-weight-coefficient calculating circuits 52a are provided in the level-weight-coefficient calculating unit 52. In FIG. 3, to simplify the explanation, only the level-weight-coefficient calculating circuits 52a for calculating level weight coefficients Wlevel[2, 0] and Wlevel[0, 2] in the peripheral pixels 62 in a position X20 and a position X02 are shown.

The pixel level Y11 of the pixel of attention 61 and the pixel levels Yij of the pixels in the 3×3 filter frame are respectively input to two input terminals of the level-weight-coefficient calculating circuit 52a. The level-weight-coefficient calculating circuit 52a calculates the level weight coefficients Wlevel [i, j] from Formula 5 on the basis of the pixel level Y11 of the pixel of attention 61 and the pixel level Yij of the pixels input thereto. The level-weight-coefficient calculating circuit 52a outputs the calculated level weight coefficients Wlevel[i, j] to the level-weight-coefficient adjusting unit 53.

The level-weight-coefficient adjusting unit 53 adjusts the level weight coefficients Wlevel[i, j] such that the level weight coefficients Wlevel[i, j] of the peripheral pixels 62 calculated by the level-weight-coefficient calculating unit 52 are symmetrical with respect to the pixel of attention 61 in all axis directions passing the pixel of attention 61. Since an edge-preserving smoothing filter such as the bilateral filter is an FIR filter, it is possible to linearize phase characteristics by setting filter coefficients symmetrical with respect to the center of the filter on a one-dimensional axis.

Figure 4:
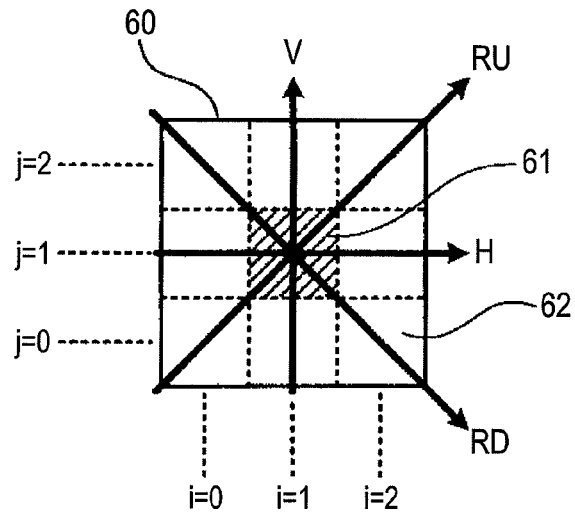
FIG. 4 is a diagram of axis directions passing a pixel of attention in a filter frame.

Axis directions in which the level weight coefficients Wlevel[i, j] are set symmetrical with respect to the pixel of attention 61 in the level-weight-coefficient adjusting unit is shown in FIG. 4. Among four axis directions, two directions are opposed directions of sides (opposite side directions) of the pixel of attention 61 and the remaining two directions are diagonal directions of the pixel of attention 61. More specifically, one of the opposite side directions is an axis direction from the peripheral pixel 62 in a position X01 to the peripheral pixel 62 in a position X21 (an H (horizontal) axis direction in FIG. 4). The other opposite side direction is an axis direction from the peripheral pixel 62 in a position X10 to the peripheral pixel 62 in a position X12 (a V (vertical) axis direction in FIG. 4). One of the diagonal directions is an axis direction from the peripheral pixel 62 in a position X00 to the peripheral pixel 62 in a position X22 (an RU (right up) direction in FIG. 4). The other diagonal direction is an axis direction from the peripheral pixel 62 in a position X02 to the peripheral pixel 62 in the position X20 (an RD (right down) axis direction).

The level-weight-coefficient adjusting unit 53 adjusts the level weight coefficients Wlevel[i, j] of the peripheral pixels 62 such that the level weight coefficients Wlevel[i, j] of the peripheral pixels 62 are symmetrical with respect to the pixel of attention 61 in the four axis directions passing the pixel of attention 61. Specifically, in this embodiment, the level-weight-coefficient adjusting unit 53 adjusts the level weight coefficients Wlevel[i, j] according to the following Formula 6.

$$W\text{level}[i,j]=W\text{level}[2-i,2-j]=\alpha ij \quad \text{Formula 6}$$

The level weight coefficients Wlevel[i, j] of the peripheral pixels 62 are set symmetrical with respect to the pixel of attention 61 by adjusting the level weight coefficients Wlevel [i, j] of the pixels according to Formula 6. Further, in this embodiment, level weight coefficients αij are adjusted to a smaller value of Wlevel[i, j] and Wlevel[2−i, 2−i]. In other words, the level weight coefficients αij are calculated by the following Formula 7.

$$\alpha ij=\min(W\text{level}[i,j],W\text{level}[2-i,2-j]) \quad \text{Formula 7}$$

The level weight coefficients αij are adjusted to the smaller value of Wlevel[i, j] and Wlevel[2−i, 2−j] because of the reasons explained below.

Usually, since noise has a high-frequency component, a cutoff frequency is designed to cut off the high-frequency component from the viewpoint of noise removal by a filter. The cutoff frequency means a frequency, a gain of which is a maximum gain −6 dB of a pass band when a certain frequency band is cut off by the filter. When the cutoff frequency is low, smoothing of pixel levels is intensified. When the cutoff frequency is high, signal components of higher frequencies remain in an image.

Therefore, it is assumed that an edge of an object image is included in a filter of 3×3 pixels. In this case, a frequency component corresponding to the edge is included in high-frequency domains of space frequency characteristics in axis directions across the edge among all the directions passing the pixel of attention 61. Therefore, it is desirable to set, in the axis direction across the edge, a cutoff frequency of the filter high to some degree in order to leave the frequency component corresponding to the edge. On the other hand, the frequency component corresponding to the edge is not included in space frequency characteristics in a direction along the edge among all the directions passing the pixel of attention 61. Therefore, it is desirable to lower the cutoff frequency as much as possible to further intensify smoothing of pixel levels.

In this embodiment, it is possible to change the cutoff frequency in the axis directions according to an edge direction and satisfy the two conditions between the axis direction corresponding to the edge and the cutoff frequency by setting the level weight coefficients αij to satisfy Formula 7. In other words, it is possible to realize edge-preserving smoothing while keeping linearity of phases of level weight coefficients by setting the level weight coefficients αij symmetrical in all the directions passing the pixel of attention 61 according to Formula 7. This is more specifically explained in frequency characteristics of the linear-phase edge-preserving smoothing filter to be explained later.

The space-weight-coefficient supplying unit 54 outputs space weight coefficients Wspace[i, j] (second weight coefficients) in the pixels in the 3×3 filter frame. The space weight coefficients Wspace[i, j] are calculated on the basis of differences (Xij−X11) between the positions Xij of the pixels (the pixel of attention 61 or the peripheral pixels 62) in the 3×3 filter frame and the position X11 of the pixel of attention 61. Specifically, the space weight coefficients Wspace[i,] of the pixels are calculated by the following Formula 8.

$$W\text{space}[i,j]=G\text{space}(Xij-X11) \quad \text{Formula 8}$$

The space weight coefficients Wspace[i, j] are symmetrical in all the axis directions passing the pixel of attention 61 and have a fixed value. Therefore, the distribution of the space weight coefficients Wspace[i, j] in the pixels in the 3×3 filter frame may be stored in advance in the space-weight-coefficient supplying unit 54 as a table. Every time the input image signal 60 of the 3×3 pixels is input, the space-weight-coefficient supplying unit 54 may calculate the space weight coefficient Wspace[i, j] according to Formula 8.

The integrating unit 55 integrates the level weight coefficients αij in the pixels output from the level-weight-coefficient adjusting unit 53 and the space weight coefficients Wspace[i, j] output from the space-weight-coefficient supplying unit 54 to calculate weights Wij in the pixels in the 3×3 filter frame. Specifically, the integrating unit 55 performs an arithmetic operation of the following Formula 9 to calculate the weights Wij (third weight coefficients).

$$Wij=W\text{space}[i,j]\times\alpha ij \quad \text{Formula 9}$$

In order to realize the arithmetic operation of Formula 9, the integrating unit 55 includes, as shown in FIG. 3, plural integrators 55a. In this example, since the 3×3 filter frame is used, nine integrators 55a are provided in the integrating unit 55. In FIG. 3, to simplify the explanation, only the integrators 55a for calculating weights W20 and W02 in the peripheral pixels 62 in the position X20 and the position X02 are shown. The integrating unit 55 outputs the weights Wij calculated by the integrators 55a to integrators 57 and an averaging processing unit 58 in the weighted-pixel addition unit 56 to be explained later.

The weighted-pixel addition unit 56 weights the level values Yij of the pixels using the weights Wij in the pixels in the 3×3 filter frame output from the weight-coefficient processing unit 51 and adds up and averages the weighted level values of the pixels. The weighted-pixel addition unit 56 sets a level value calculated in this way as a level value Y11' after smoothing processing of the pixel of attention 61. Specifically, the weighted-pixel addition unit 56 performs an arithmetic operation of the following Formula 10.

$$Y11' = \sum_{i,j=0}^{2} (Wij \times Yij) \bigg/ \sum_{i,j=0}^{2} Wij \qquad \text{Formula 10}$$

In order to realize the arithmetic operation of Formula 10, the weighted-pixel addition unit 56 includes, as shown in FIG. 3, the plural integrators 57 and the averaging processing unit 58. In this example, since the 3×3 filter frame is used, nine integrators 57 are provided in the weighted-pixel addition unit 56.

Each integrator 57 calculates a value of "Wij×Yij" of the numerator in Formula 10. In FIG. 3, in order to simplify the explanation, only the integrators 57 for applying arithmetic operations of "W20×Y20" and "W02×Y02" respectively to the peripheral pixels 62 in the position X20 and the position X02 are shown. The integrators 57 output the calculated values of "Wij×Yij" to the averaging processing unit 58.

The averaging processing unit 58 performs the arithmetic operation of Formula 10 using the weights Wij of the pixels output from the weight-coefficient processing unit 51 and the values of "Wij×Yij" output from the integrator 57.

<2. Procedure of Image Processing>

Figure 5:
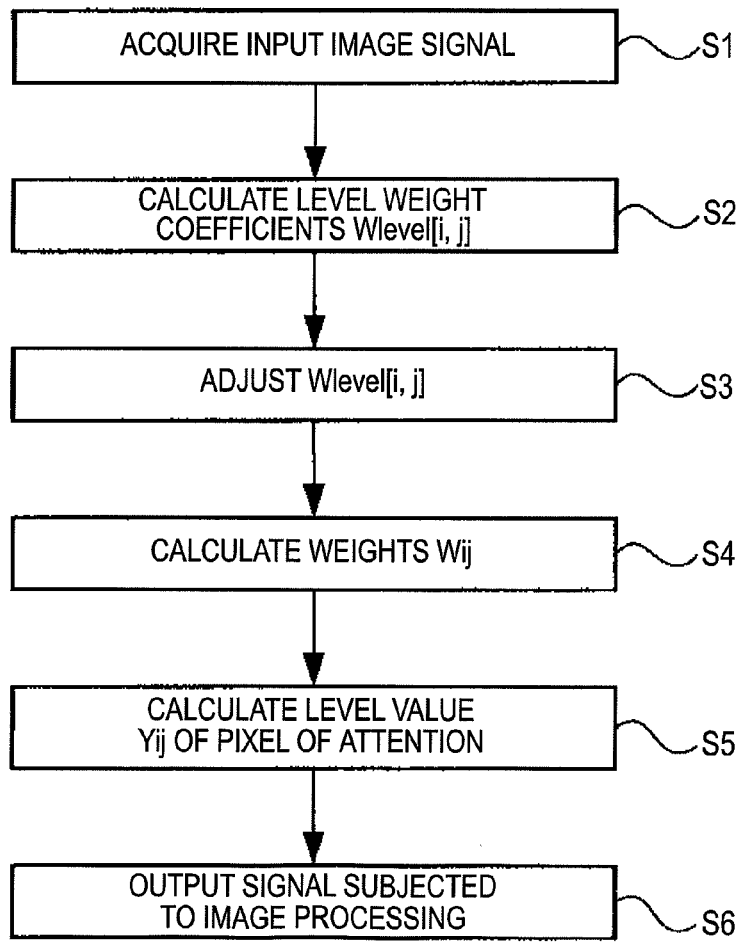
FIG. 5 is a flowchart for explaining a procedure of an image processing method according to the embodiment.

A procedure of image processing in the linear-phase edge-preserving smoothing filter 50 in this embodiment is explained below with reference to FIG. 5. FIG. 5 is a flowchart for explaining the procedure of the image processing.

First, the linear-phase edge-preserving smoothing filter 50 acquires the input image signal 60 of the 3×3 pixels around the pixel of attention 61 (step S1). The level values Yij of the pixels are input to the weight-coefficient processing unit 51 and the weighted-pixel addition unit 56. Subsequently, the level-weight-coefficient calculating unit 52 in the weight-coefficient processing unit 51 calculates the level weight coefficients Wlevel[i, j] of the pixels in the 3×3 pixels on the basis of Formula 5 (step S2).

Figure 6A:
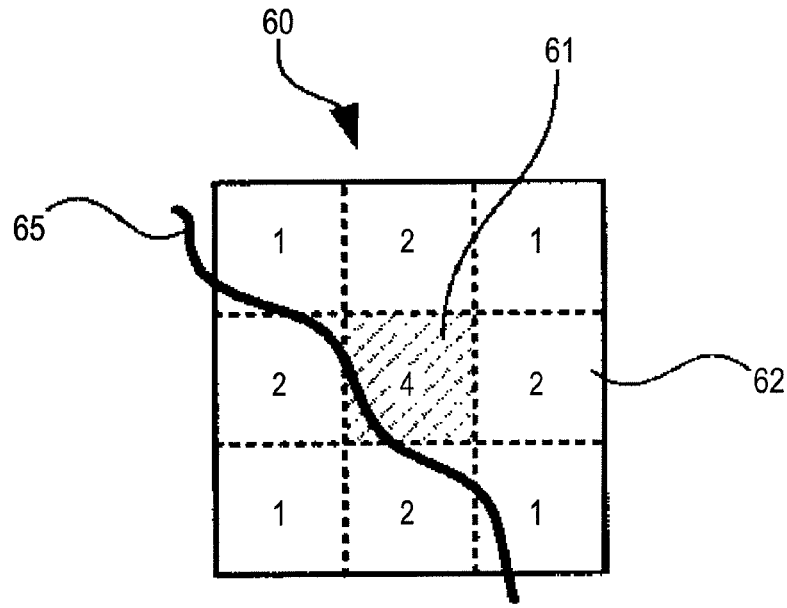
FIG. 6A is a diagram of an example of the distribution of weight coefficients in a space direction before weight coefficient adjustment.
Figure 6B:
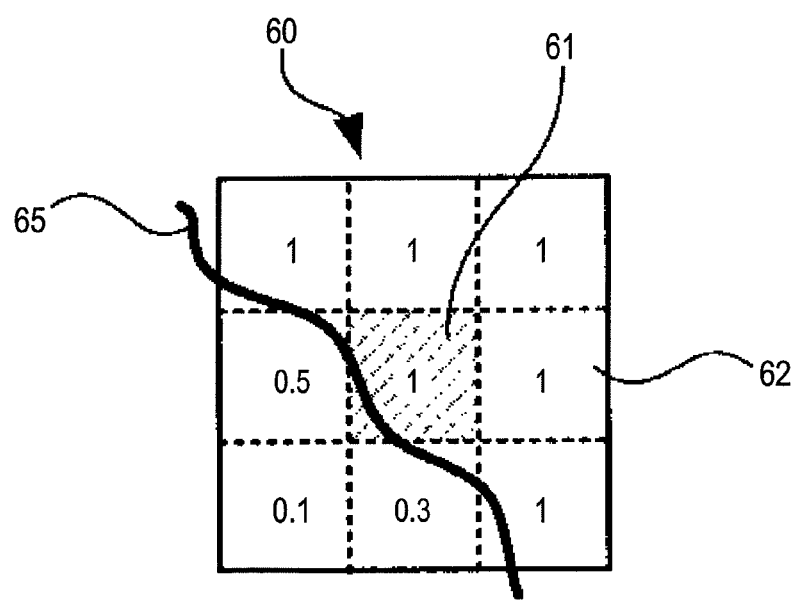
FIG. 6B is a diagram of an example of the distribution of weight coefficients in a level direction before the weight coefficient adjustment.

In FIGS. 6A and 6B, examples of the distribution of the weight coefficients Wlevel[i, j] of the pixels in the 3×3 pixels obtained in step S2 are shown. FIG. 6A is a diagram of an example of the distribution of the space weight coefficients Wspace[i, j]. FIG. 6B is a diagram of an example of the distribution of the level weight coefficient Wlevel[i, j]. In FIGS. 6A and 6B, an example in which an edge 65 of an object is present along an RD axis direction (see FIG. 4) in the 3×3 pixels is shown.

At a point when the processing in step S2 ends, the distribution of the weight coefficients Wlevel[i, j] is the same as that obtained in the processing in the bilateral filter in the past. Therefore, the distribution of the space weight coefficients Wspace[i, j] (FIG. 6A) is symmetrical with respect to the pixel of attention 61 in all the axis directions. However, the distribution of the level weight coefficients Wlevel[i, j] (FIG. 6B) is asymmetrical with respect to the pixel of attention 61 depending on the axis directions and has a nonlinear phase property (nonlinearity).

Subsequently, the level-weight-coefficient adjusting unit 53 adjusts the level weight coefficients Wlevel[i, j] such that the level weight coefficients Wlevel[i, j] of the pixels in the 3×3 pixels are symmetrical with respect to the pixel of attention 61 in all the axis direction (step S3: linear-phase correction processing). The level-weight-coefficient adjusting unit 53 adjusts the level weight coefficients Wlevel[i, j] according to Formula 7. The level-weight-coefficient adjusting unit 53 outputs the level weight coefficients αij of the pixels calculated by the linear-phase correction processing to the integrating unit 55.

Figure 7A:
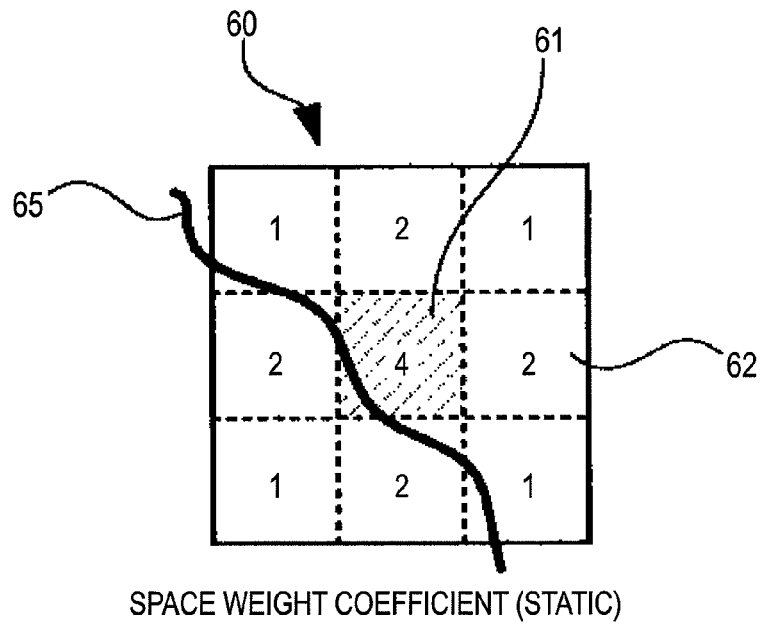
FIG. 7A is a diagram of an example of the distribution of weight coefficients in the space direction after the weight coefficient adjustment.
Figure 7B:
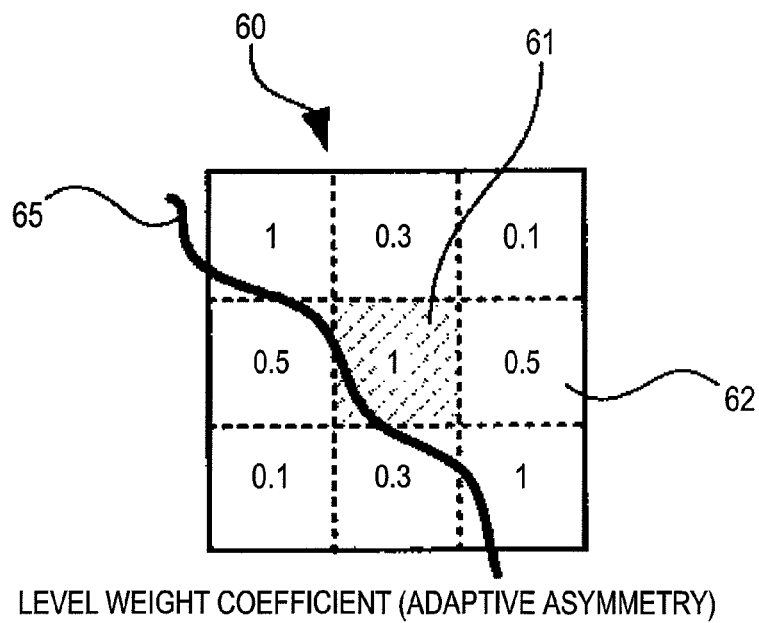
FIG. 7B is a diagram of an example of the distribution of weight coefficients in the level direction after the weight coefficient adjustment.

In FIGS. 7A and 7B, examples of the distribution of the level weight coefficients Wlevel[i, j] of the pixels in the 3×3 pixels obtained in step S3 are shown. FIG. 7A is a diagram of an example of the distribution of the space weight coefficients Wspace[i, j]. FIG. 7B is a diagram of an example of the distribution of the level weight coefficients Wlevel[i, j]. The distributions shown in FIGS. 7A and 7B are examples obtained by applying the adjustment processing for level weight coefficients in step S3 to the examples of the distributions of the level weight coefficients Wlevel[i, j] shown in FIGS. 6A and 6B.

In the example shown in FIG. 7B, in an H axis direction, a level weight coefficient α21 of the peripheral pixel 62 in the position X21 is changed from 1 to 0.5 to be adjusted to a level weight coefficient α01 (=0.5) of the peripheral pixel 62 in the position X01. In a V axis direction, a level weight coefficient α12 of the peripheral pixel 62 in the position X12 is changed from 1 to 0.3 to be adjusted to a level weight coefficient α10 (=0.3) of the peripheral pixel 62 in the position X10. In an RU axis direction, a level weight coefficient α22 of the peripheral pixel 62 in the position X22 is changed from 1 to 0.1 to be adjusted to a level weight coefficient α00 (=0.1) of the peripheral pixel 62 in the position X00.

In step S3, as explained above, the level-weight-coefficient adjusting unit 53 adjusts the level weight coefficients Wlevel[i, j] to be symmetrical with respect to the pixel of attention 61 in all the axis directions in the 3×3 pixels. The distribution of the space weight coefficient Wspace[i, j] is symmetrical with respect to the pixel of attention 61 and fixed in all the axis directions in the 3×3 pixels.

Subsequently, the integrating unit 55 reads out the space weight coefficients Wspace[i, j] of the pixels from the space-weight-coefficient supplying unit 54. The integrating unit 55 integrates values of the space weight coefficients Wspace[i, j] with the level weight coefficients αij of the pixels after the level weight coefficient adjustment input to the integrating unit 55 to calculate the weights Wij (step S4). The integrating unit 55 outputs the calculated weights Wij of the pixels to the weighted-pixel addition unit 56.

Subsequently, the weighted-pixel addition unit 56 calculates the level value Y11' of the pixel of attention 61 according to Formula 10 using the level values Yij of the pixels directly obtained from the input image signal 60 and the weights Wij of the pixels input from the integrating unit 55 (step S5). Specifically, the weighted-pixel addition unit 56 integrates, with the integrators 57, the level values Yij of the pixels directly obtained from the input image signal 60 and the weights Wij of the pixels input from the integrating unit 55, adds up the integrated values with the averaging processing unit 58, and averages the added-up value with the weights Wij.

The weighted-pixel adding unit 56 outputs the level value Y11' of the pixel of attention 61 subjected to the smoothing processing to a predetermined circuit arranged at a post-stage (step S6). In the linear-phase edge-preserving smoothing filter 50 in this embodiment, the level value Y11' of the pixel of attention 61 is smoothed as explained above.

<3. Frequency Characteristics of the Linear-Phase Edge-Preserving Smoothing Filter>

Frequency characteristics of phase components and amplitude components (gains) of filter characteristics of level weight coefficients in the linear-phase edge-preserving smoothing filter 50 in this embodiment are explained below with reference to FIGS. 8A to 8C and FIGS. 9A to 9C. As explained above, filter characteristics of the level weight coefficients Wlevel[i, j] (=αij) are represented by complex numbers. Therefore, in evaluation of the filter characteristics of the level weight coefficients Wlevel[i, j], both of the phase components and the amplitude components need to be evaluated. In the following explanation, filter characteristics obtained when the level weight coefficients shown in FIG. 7B are used for the pixels in the 3×3 pixels are explained.

Figure 8A:
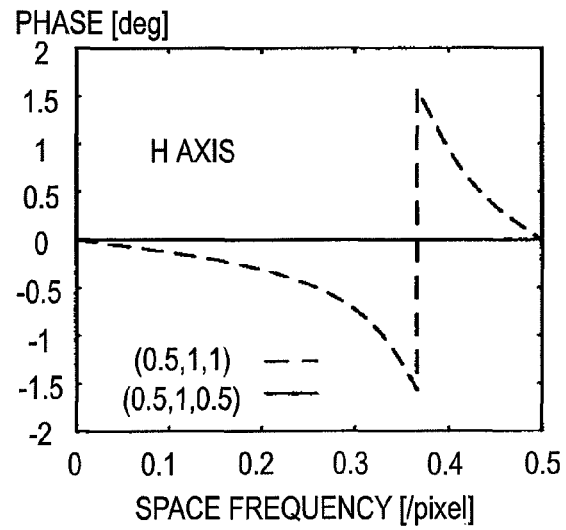
FIG. 8A is a graph of a frequency characteristic of a phase of the linear-phase edge-preserving smoothing filter in an H axis direction in FIG. 4.
Figure 8B:
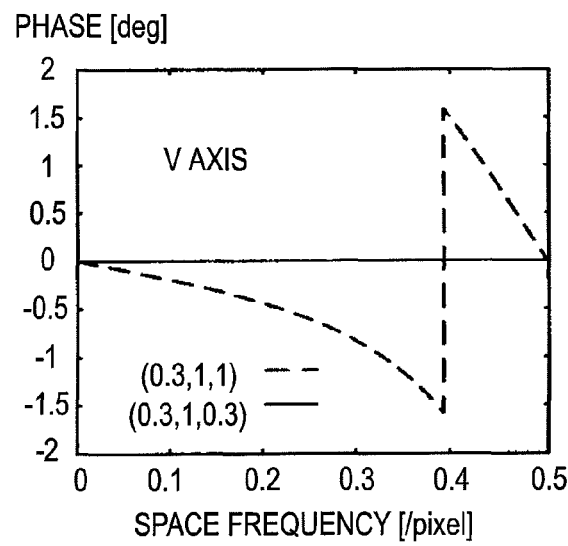
FIG. 8B is a graph of a frequency characteristic of a phase of the linear-phase edge-preserving smoothing filter in a V axis direction in FIG. 4.
Figure 8C:
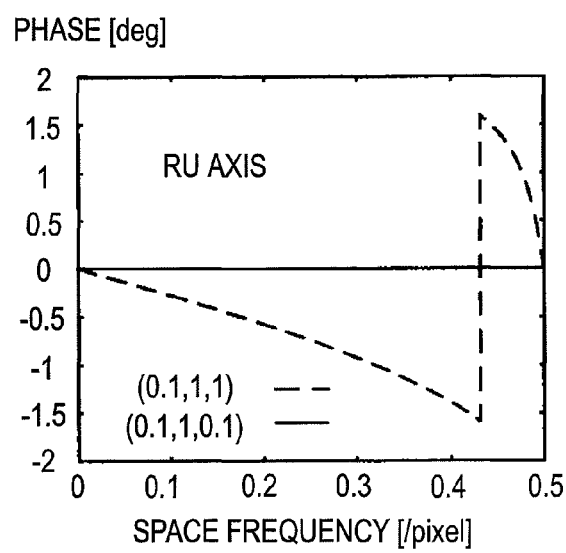
FIG. 8C is a graph of a frequency characteristic of a phase of the linear-phase edge-preserving smoothing filter in a U axis direction in FIG. 4.

First, frequency characteristics of phase components of filter characteristics of level weight coefficients in the linear-phase edge preserving smoothing filter in this embodiment are explained. Frequency characteristics of phases in the filter characteristics of the level weight coefficients are shown in FIGS. 8A to 8C. FIG. 8A is a graph of a frequency characteristic of a phase of the filter characteristics of the level weight coefficients in the H axis direction. FIG. 8B is a graph of a frequency characteristic of a phase of the filter characteristics of the level weight coefficients in the V axis direction. FIG. 8C is a graph of a frequency characteristic of a phase of the filter characteristics of the level weigh coefficients in the RU axis direction. In FIGS. 8A to 8C, for comparison, frequency characteristics of phases of filter characteristics of level weight coefficients obtained when the linear-phase correction processing is applied to the level weight coefficients (a comparative example: the image processing in the bilateral filter in the past) are also shown. As the distribution of level weight coefficients of the pixels in the 3×3 pixels in the bilateral filter of the comparative example, the distribution shown in FIG. 6B is used.

In FIGS. 8A to 8C, the abscissa represents the space frequency and the ordinate represents the phase in the filter characteristics of the level weight coefficients. Frequency characteristics indicated by solid lines in FIGS. 8A to 8C are the characteristics of this embodiment. Frequency characteristics indicated by broken lines are the characteristics of the comparative example.

In the bilateral filter in the comparative example, as shown in FIG. 6B, the distribution of the level weight coefficients is asymmetrical with respect to the pixel of attention 61 in the H axis direction, the V axis direction, and the RU axis direction. Therefore, the phases of the filter characteristics of the level weight coefficients fluctuate (are nonlinear) with respect to a space frequency as indicated by the broken line characteristics in FIGS. 8A to 8C.

On the other hand, in the linear-phase edge-preserving smoothing filter 50 in this embodiment, as shown in FIG. 7B, the distribution of the level weight coefficients is symmetrical with respect to the pixel of attention 61 in all the axis directions. Therefore, the phases of the filter characteristics of the level weight coefficients are fixed with respect to the space frequency as indicated by the solid line characteristics in FIGS. 8A to 8C.

Although not shown in the figure, in the RD axis direction along the edge 65, in both of this embodiment and the comparative example, the level weight coefficients of the peripheral pixels 62 are symmetrical with respect to the pixel of attention 61. Therefore, the frequency characteristics of the filter characteristics of the phases of the level weight coefficients are fixed with respect to the space frequency in both the cases.

It is seen from the above that the phase characteristics are linearized by setting the distribution of the level weight coefficients of the peripheral pixels 62 symmetrical with respect to the pixel of attention 61 in all the axis directions passing the pixel of attention 61. Therefore, in this embodiment, a delay difference does not occur in phases between adjacent pixels after the filter processing. An image waveform after the filter processing is not distorted.

Figure 9A:
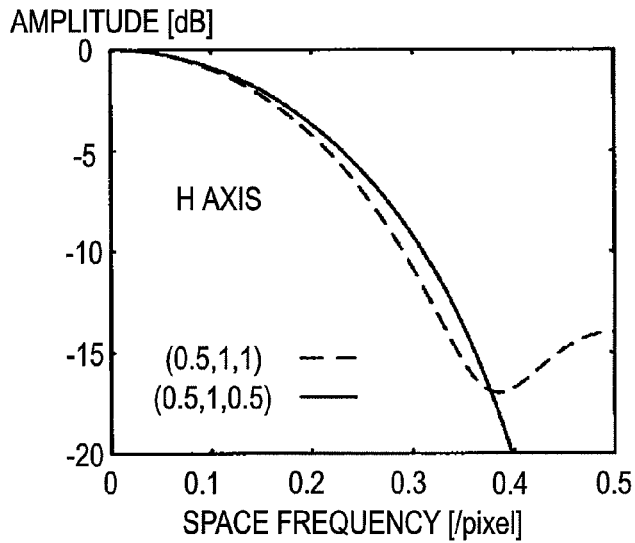
FIG. 9A is a graph of a frequency characteristic of a gain of the linear-phase edge-preserving smoothing filter in the H axis direction in FIG. 4.
Figure 9B:
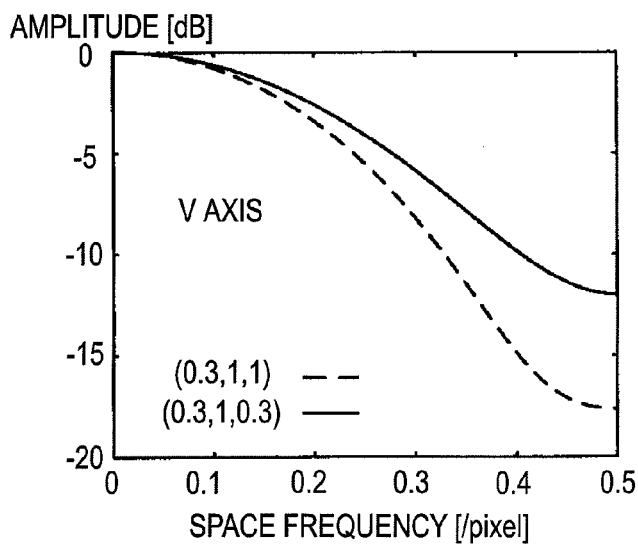
FIG. 9B is a graph of a frequency characteristic of a gain of the linear-phase edge-preserving smoothing filter in the V axis direction in FIG. 4.
Figure 9C:
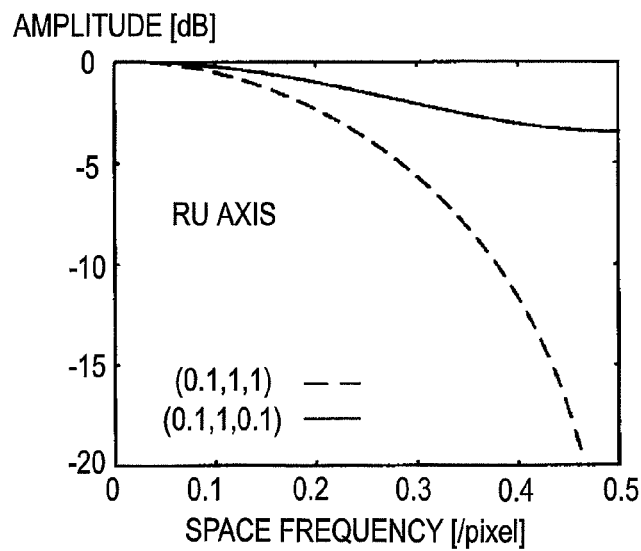
FIG. 9C is a graph of a frequency characteristic of a gain of the linear-phase edge-preserving smoothing filter in the U axis direction in FIG. 4.

Frequency characteristics of amplitude components (gains) of filter characteristics of level weight coefficients in the linear-phase edge-preserving smoothing filter in this embodiment are explained below. In FIGS. 9A to 9C, frequency characteristics of amplitudes in the filter characteristics of the level weight coefficients are shown. FIG. 9A is a graph of a frequency characteristic of amplitude of the filter characteristics of the level weight coefficients in the H axis direction. FIG. 9B is a graph of a frequency characteristic of amplitude of the filter characteristics of the level weigh coefficients in the V axis direction. FIG. 9C is a graph of a frequency characteristic of the amplitude of the filter characteristics of the level weight coefficients in the RU axis direction.

In FIGS. 9A to 9C, the abscissa represents the space frequency and the ordinate represents amplitudes in the filter characteristics of the level weight coefficients. In FIGS. 9A to 9C, frequency characteristics of amplitudes of the filter characteristics of the level weight coefficients in the comparative example are also shown. Frequency characteristics indicated by solid lines in FIGS. 9A to 9C are the characteristics of this embodiment. Frequency characteristics indicated by broken lines are the characteristics of the comparative example. Frequency characteristics of amplitude of the filter characteristics of the level weight coefficients in this embodiment and the comparative example in the RD axis direction along the edge 65 are the same. Therefore, explanation of the frequency characteristics is omitted.

As it is evident from the frequency characteristics of amplitude in the filter characteristics of the level weight coefficient shown in FIGS. 9A to 9C, it is seen that, in this embodiment, cutoff frequencies are higher in order of the smallness of the level weight coefficients $\alpha ij$ of the peripheral pixels 62, i.e., in order of the RU axis direction, the V axis direction, and the H axis direction. This indicates that frequency components corresponding to the edge 65 remaining in a high-frequency domain of space frequency characteristics increase in order of the RU axis direction, the V axis direction, and the H axis direction. Therefore, in this embodiment, it is possible to reduce the cutoff frequency and increase smoothness in the axis direction along the edge 65 and increase the cutoff frequency in the axis direction across the edge 65 and leave the frequency components corresponding to the edge 65.

This is also evident from the distribution of the level weight coefficients $\alpha ij$ of the peripheral pixels 62 shown in FIG. 7B. In the distribution of the level weight coefficients $\alpha ij$ of the peripheral pixels 62 shown in FIG. 7B, the level weight coefficients $\alpha ij$ is smaller in order of the RU axis direction, the V axis direction, and the H axis direction. Therefore, the smoothness is also smaller in this order. This indicates that a level difference increases (an edge steepens) between pixels near the edge 65 in order of the RU axis direction, the V axis direction, and the H axis direction and indicates that the frequency components corresponding to the edge 65 remaining in the high-frequency domain of the space frequency characteristics increase.

When the frequency characteristics of amplitude in the filter characteristics of the level weight coefficients in this embodiment are compared with those in the comparative example, in particular, in the characteristic in the RU axis direction (see FIG. 9C), the fall in amplitude of weight in the high-frequency domain becomes extremely gentle in this embodiment. Therefore, in this embodiment, in an axis direction including a larger number of frequency components corresponding to the edge 65 like the RU axis direction, a much larger number of the frequency components can be included. Thus, preservability of the edge 65 can be further improved.

It is seen from the frequency characteristics of the linear-phase edge-preserving smoothing filter 50 in this embodiment that it is possible to impart linearity to the phases of the level weight coefficients while maintaining the characteristics of the edge-preserving smoothing filter in the past. Therefore, in the linear-phase edge-preserving smoothing filter 50 in this embodiment, it is possible to suppress distortion of an image and to achieve the same effects as those of the edge-preserving smoothing filter in the past. In the linear-phase edge-preserving smoothing filter 50 in this embodiment, effects explained below can also be obtained besides the effects explained above.

In the past, there is a static filter, weight coefficients of which have a linear phase property (weight coefficients of which are always fixed). In such a filter, in general, filter coefficients are set radially symmetrical with a pixel of attention as a center point. On the other hand, in this embodiment, the level weight coefficients of the peripheral pixels 62 are adaptively adjusted according to input pixel levels of the peripheral pixels 62 so as to be symmetrical with respect to all the axis directions passing the pixel of attention 61. Therefore, in this embodiment, it is possible to further improve preservability of an edge compared with the static filter having the linear phase property.

Further, in the linear-phase edge-preserving smoothing filter 50 in this embodiment, it is possible to reduce resource impact (hardware cost) involved in linearization of phases. Therefore, possibility of the circuit is high.

In the embodiment, the example in which the filter frame includes 3×3 pixels has been explained. However, the present invention is not limited to this. For example, the present invention can be applied, based on the same principle as the principle explained above, even when a filter frame of larger than 3×3 pixels is used. In the edge-preserving smoothing filter such as the bilateral filter, degree of the smoothing in the axis direction along the edge is maximized. As a filter frame is larger, axis directions of the filter frame in which such effect can be obtained increase, and therefore, the filter frame is desirably as large as possible.

In the embodiment, the example in which the present invention is applied to the bilateral filter in the past has been explained. However, the present invention is not limited to this. For example, derivative filters of the bilateral filter such as a $\epsilon$ filter, an NL (Non Local)-means filter, and a trilateral filter also have the nonlinear phase property. Therefore, the present invention can also be applied to these filters and the same effects can be obtained.

In the embodiment, the example in which the image processing apparatus (the imaging apparatus) is configured as the dedicated apparatus has been explained. However, the present invention is not limited to this. For example, the processing in the embodiment may be performed by mounting software (a computer program) for performing the image processing in the embodiment on a personal computer to which necessary peripheral equipment is connected to perform various kinds of data processing. In this case, the computer program for executing the processing in the embodiment may be downloaded via transmitting means such as the Internet besides being distributed by media such as an optical disk and a semiconductor memory.

The present application contains subject matter related to that disclosed in Japanese Priority Patent Application JP 2009-131290 filed in the Japan Patent Office on May 29, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A filter circuit comprising:
   a first weight-coefficient calculating unit that calculates first weight coefficients concerning pixel levels in a first pixel and plural second pixels arranged around the first pixel;
   a first weight-coefficient adjusting unit that replaces, when the first weight coefficients of a pair of the second pixels arranged in symmetrical positions across the first pixel are different from each other, the first weight coefficient of the second pixel having a larger one of the first weight coefficients of the pair of the second pixels with the first weight coefficient of the second pixel having a smaller one of the first weight coefficients;
   a third weight-coefficient calculating unit that integrates the first weight coefficients of the pixels calculated by the first weight-coefficient adjusting unit and second weight coefficients concerning positions of the pixels to calculate third weight coefficients of the pixels; and
   a correction processing unit that corrects the pixel level of the first pixel using the third weight coefficients of the pixels calculated by the third weight-coefficient calculating unit and the pixel levels of the pixels.

2. A filter circuit according to claim 1, wherein
   the first weight coefficients of the pixels calculated by the first weight-coefficient calculating unit are represented by Gaussian functions with the differences between the pixel levels of the pixels and the pixel level of the first pixel set as variables, and
   the second weight coefficients of the pixels are represented by Gaussian functions with the distances of the pixels from the first pixel set as variables.

3. An image processing apparatus comprising:
   a filter circuit including a first weight-coefficient calculating unit that calculates first weight coefficients concerning pixel levels in a first pixel and plural second pixels arranged around the first pixel, a first weight-coefficient adjusting unit that replaces, when the first weight coefficients of a pair of the second pixels arranged in symmetrical positions across the first pixel are different from each other, the first weight coefficient of the second pixel having a larger one of the first weight coefficients of the pair of the second pixels with the first weight coefficient of the second pixel having a smaller one of the first weight coefficients, a third weight-coefficient calculating unit that integrates the first weight coefficients of the pixels calculated by the first weight-coefficient adjusting unit and second weight coefficients concerning positions of the pixels to calculate third weight coefficients of the pixels, and a correction processing unit that corrects the pixel level of the first pixel using the third weight coefficients of the pixels calculated by the third weight-coefficient calculating unit and the pixel levels of the pixels; and
   a control unit that controls processing operation of the filter circuit.

4. An imaging apparatus comprising:
   an imaging unit that photoelectrically converts subject light to generate an image signal; and
   a filter circuit including a first weight-coefficient calculating unit that calculates first weight coefficients concerning pixel levels in a first pixel and plural second pixels arranged around the first pixel, a first weight-coefficient adjusting unit that replaces, when the first weight coefficients of a pair of the second pixels arranged in symmetrical positions across the first pixel are different from each other, the first weight coefficient of the second pixel having a larger one of the first weight coefficients of the pair of the second pixels with the first weight coefficient of the second pixel having a smaller one of the first weight coefficients, a third weight-coefficient calculating unit that integrates the first weight coefficients of the pixels calculated by the first weight-coefficient adjusting unit and second weight coefficients concerning positions of the pixels to calculate third weight coefficients of the pixels, and a correction processing unit that corrects the pixel level of the first pixel using the third weight coefficients of the pixels calculated by the third weight-coefficient calculating unit and the pixel levels of the pixels.

5. An image processing method comprising the steps of:

calculating, using an imaging apparatus, first weight coefficients concerning pixel levels in a first pixel and plural second pixels arranged around the first pixel;

replacing, using said imaging apparatus, when the first weight coefficients of a pair of the second pixels arranged in symmetrical positions across the first pixel are different from each other, the first weight coefficient of the second pixel having a large one of the first weight coefficients of the two second pixels with the first weight coefficient of the second pixel having a smaller one of the first weight coefficients;

integrating, using said imaging apparatus, the first weight coefficients of the pixels and the second weight coefficients concerning positions of the pixels to calculate third weight coefficients of the pixels; and correcting, using said imaging apparatus, the pixel level of the first pixel using the third weight coefficients of the pixels and the pixel levels of the pixels.

6. A non-transitory computer readable medium storing a computer program to cause a computer to execute:

processing for calculating first weight coefficients concerning pixel levels in a first pixel and plural second pixels arranged around the first pixel;

processing for replacing, when the first weight coefficients of a pair of the second pixels arranged in symmetrical positions across the first pixel are different from each other, the first weight coefficient of the second pixel having a large one of the first weight coefficients of the two second pixels with the first weight coefficient of the second pixel having a smaller one of the first weight coefficients;

processing for integrating the first weight coefficients of the pixels and the second weight coefficients concerning positions of the pixels to calculate third weight coefficients of the pixels; and processing for correcting the pixel level of the first pixel using the third weight coefficients of the pixels and the pixel levels of the pixels.

* * * * *